United States Patent [19]
Liu

[11] Patent Number: 5,785,008
[45] Date of Patent: Jul. 28, 1998

[54] STRUCTURE OF DOG MUZZLE

[76] Inventor: Chun Chien Liu, 4, Chungchu Hsiang, Chungkou Tsun, Huatang Hsiang, Changhua Hsien, Taiwan

[21] Appl. No.: 966,303

[22] Filed: Nov. 7, 1997

[51] Int. Cl.[6] .................................................. A01K 25/00
[52] U.S. Cl. .................................................................. 119/831
[58] Field of Search ...................................... 119/821, 823, 119/824, 825, 826, 831, 833, 834, 835

[56] References Cited

U.S. PATENT DOCUMENTS

| | | | |
|---|---|---|---|
| 4,252,086 | 2/1981 | Schenck | 119/831 |
| 5,136,984 | 8/1992 | Askinasi | 119/831 |
| 5,267,529 | 12/1993 | Zelinger | 119/831 |

FOREIGN PATENT DOCUMENTS

| | | | |
|---|---|---|---|
| 2143111 | 2/1985 | United Kingdom | 119/831 |

*Primary Examiner*—Thomas Price
*Attorney, Agent, or Firm*—Pro-Techtor International Services

[57] ABSTRACT

A dog muzzle having a cylindrical muzzle body adapted to put over the mouth of a dog to keep it from biting, and a strap fastened to the muzzle body and adapted to secure it to the dog's head, the muzzle body having a top opening at a rear part thereof through which the dog's eyes and stop exposed to the outside, the strap having a fixed middle part stitched to the muzzle body and two free end pieces extended from two opposite ends of the fixed middle part and joined by a buckle, wherein the fixed middle part of the strap is wound round the muzzle body and fixed thereto by stitches, then crossed over each other at a bottom side of the muzzle body and extended upwardly backwards to two opposite rear corners of the top opening of the muzzle body and then fixedly secured to the muzzle body in a substantially V-shaped form by stitches.

3 Claims, 4 Drawing Sheets

STRUCTURE OF DOG MUZZLE

BACKGROUND OF THE INVENTION

The present invention relates to dog muzzles, and more articularly to an improved structure of dog muzzle which permits applied drag force to be distributed into horizontal components of force and vertical components of force to prevent a backward movement of the dog muzzle on the dog's head.

FIG. 1 shows a dog muzzle 4 according to the prior art. This structure of dog muzzle 4 comprises a cylindrical muzzle body 41 made from fabric and adapted to put over the mouth of a dog to keep it from biting, the muzzle body 41 defining a top opening 42 at its rear side, and two straps 43;44 longitudinally fastened to two opposite sides of the muzzle body 41. The straps 43;44 have a respective free end mounted with a male snap buckle element 45 or female snap buckle element 46. When the muzzle body 41 is put over the dog's mouth (see FIG. 2), the straps 43;44 are joined by fastening the male snap buckle element 45 and the female snap buckle element 46 together. This structure of dog muzzle is still not satisfactory in function. When the dog muzzle 4 is pulled backwards, the muzzle body 41 is moved backwards, thereby causing the front edge 47 of the top opening 42 of the muzzle body 41 to impart a pressure to the dog's stop and eyes, or to cover over the dog's eyes. Further, when to walk the dog, a collar 6 (see FIG. 2) or harness 7 (see FIG. 3) shall have to be fastened to the neck of the dog so that the dog can be dragged with a lead 5. Because the dog muzzle 4 and the collar 6 or harness 7 are separated members, it is expensive to prepare the dog muzzle 4 and the collar 6 or harness 7. Simultaneously fastening the dog muzzle 4 and the collar 6 or harness 7 to the dog causes the dog feel uncomfortable. Further, if the hanging ring 61 of the collar 6 is moved from the back side of the dog's neck to its front side when walking the dog, the dog tends to be trip on the lead 5.

SUMMARY OF THE INVENTION

The present invention has been accomplished under the circumstances in view. According to one aspect of the present invention, the dog muzzle comprises a cylindrical muzzle body adapted to put over the mouth of a dog to keep it from biting, and a strap fastened to the muzzle body and adapted to secure it to the dog's head, the muzzle body having a top opening at a rear part thereof through which the dog's eyes and stop exposed to the outside, the strap having a fixed middle part stitched to the muzzle body and two free end pieces extended from two opposite ends of the fixed middle part and joined by buckle means, wherein the fixed middle part of the strap is wound round the muzzle body and fixed thereto by stitches, then crossed over each other at a bottom side of the muzzle body and extended upwardly backwards to two opposite rear corners of the top opening of the muzzle body and then fixedly secured to the muzzle body in a substantially V-shaped form by stitches. According to another aspect of the present invention, a hanging ring is fastened to one free end piece of the strap for mounting a lead. According to still another aspect of the present invention, a hanging ring is fastened to the crossed point of the fixed middle part of the strap at the bottom side of the muzzle body for mounting a lead.

DETAILED DESCRIPTION OF THE PREFERRED EMBODIMENT

Figure 1:
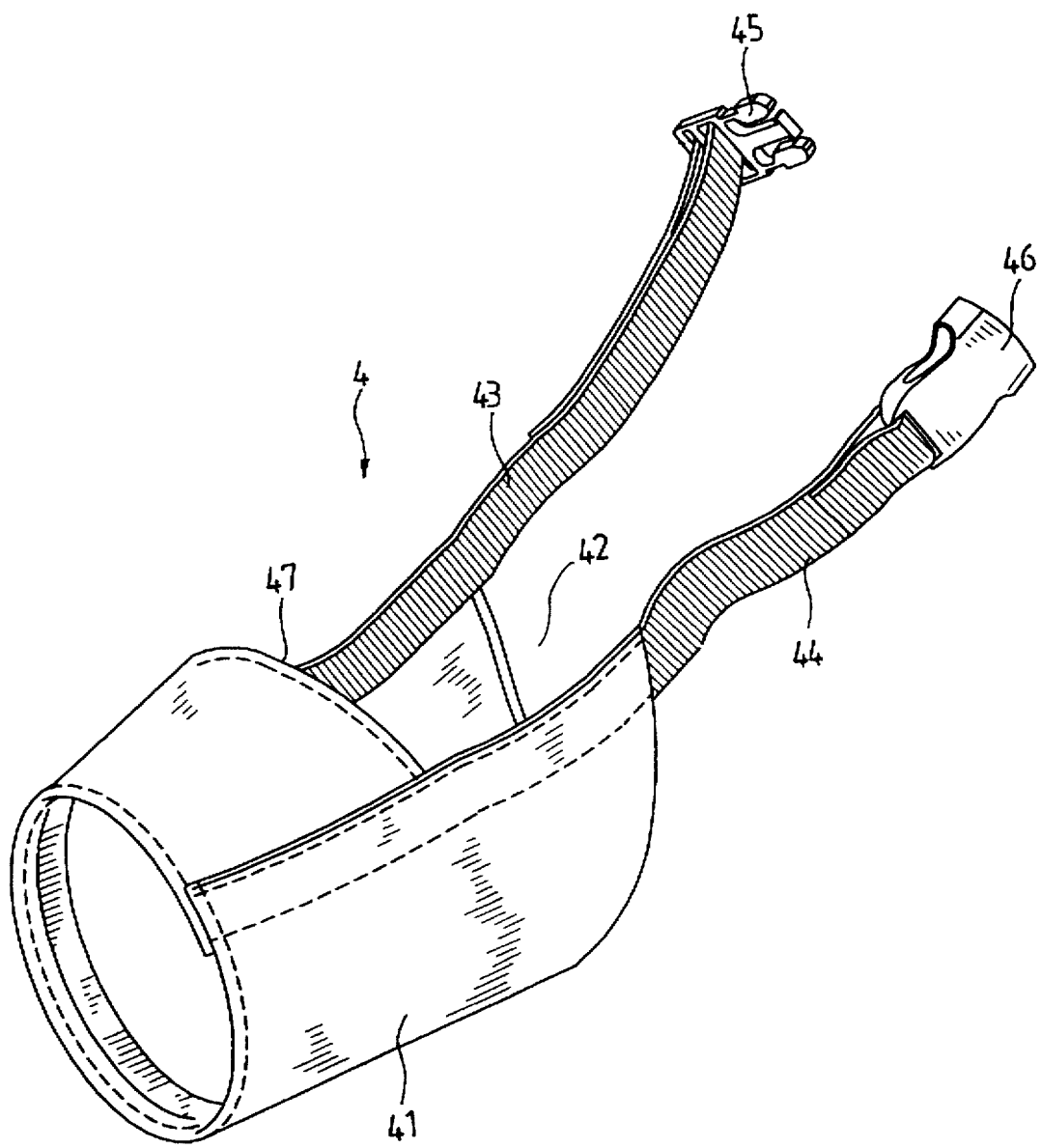
FIG. 1 is a perspective view of a dog muzzle according to the prior art.
Figure 2:
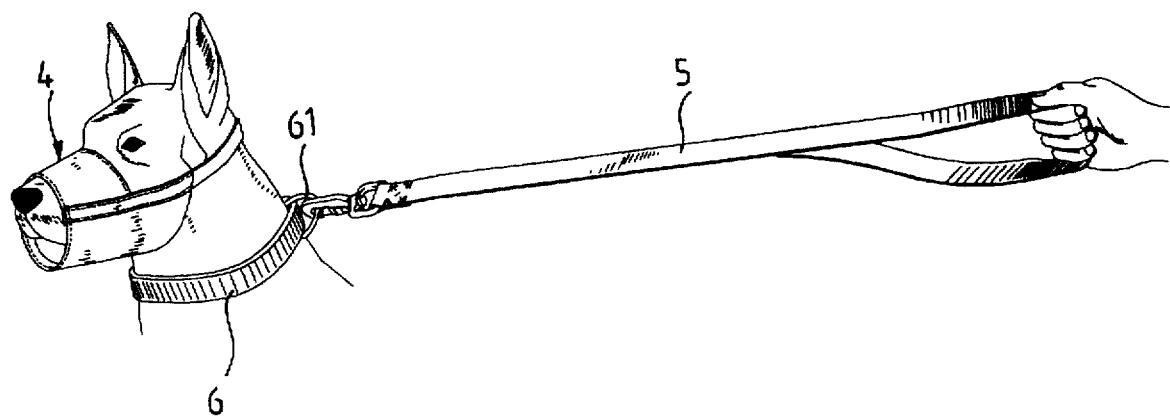
FIG. 2 shows a prior art dog muzzle fastened to the head of the dog, a lead connected to a collar on the neck of the dog.
Figure 3:
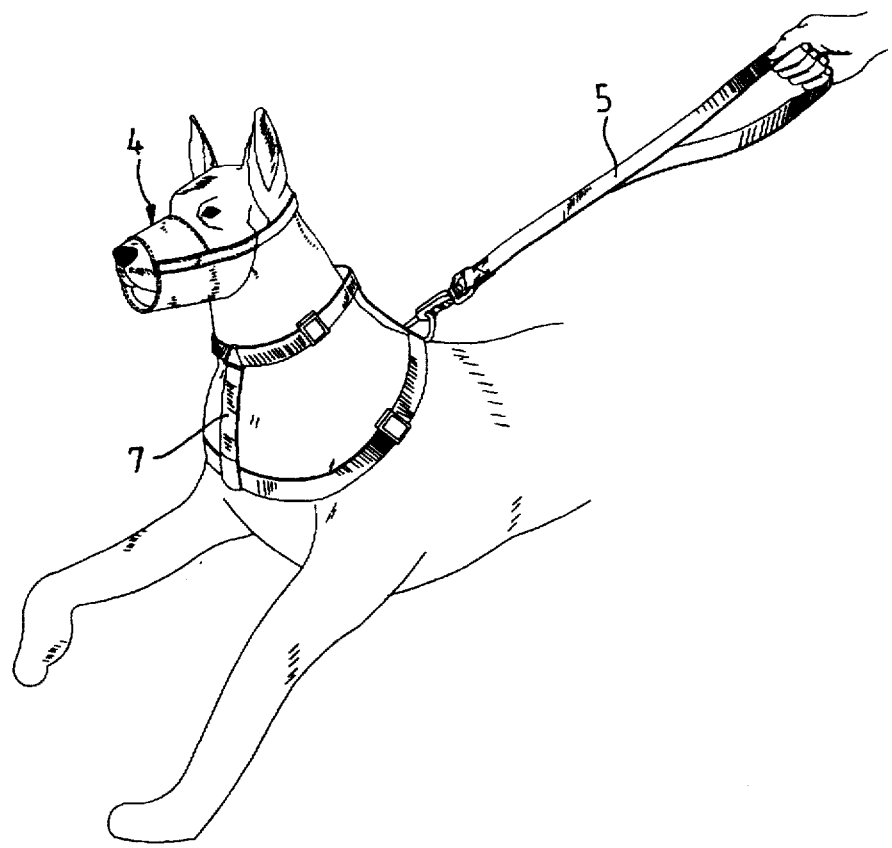
FIG. 3 shows a prior art dog muzzle fastened to the head of the dog, a lead connected to a harness on the neck of the dog.
Figure 4:
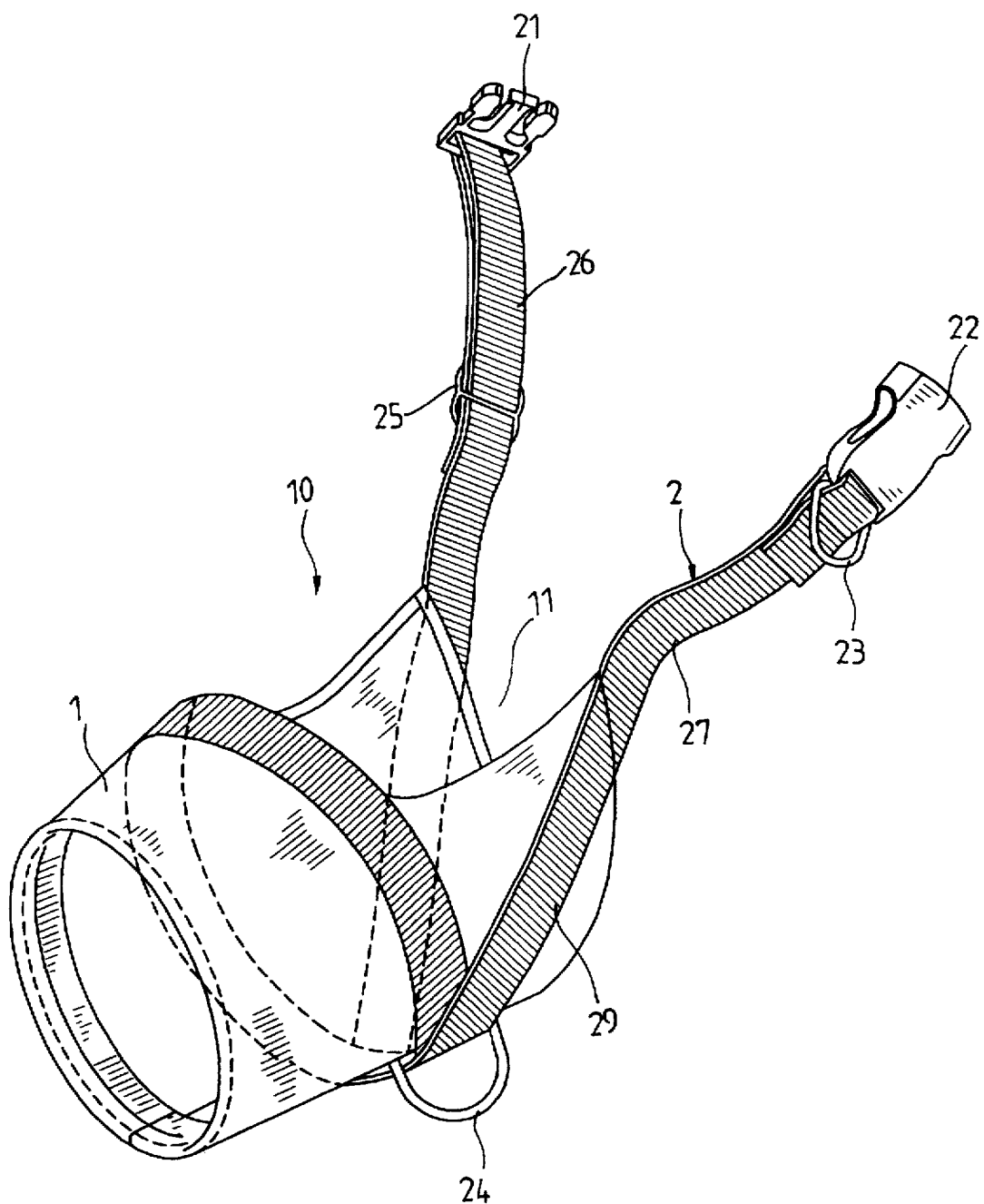
FIG. 4 is a perspective view of a dog muzzle according to the present invention.
Figure 5:
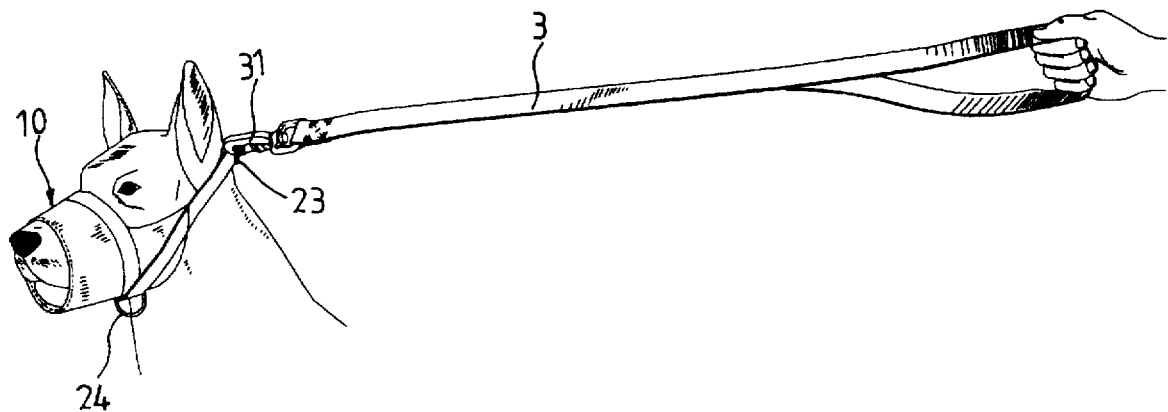
FIG. 5 is an applied view of the present invention, showing the muzzle body fastened to the head of a dog, and a swivel hook of a lead fastened to a hanging ring on one free end piece of the strap.

Referring to FIGS. 4 and 5, the dog muzzle, referenced by 10, comprises a cylindrical muzzle body 1 made from fabric and adapted to put over the mouth of a dog to keep it from biting. The rear part of the muzzle body 1 defines a top opening 11. The design of the top opening 11 prevents the muzzle body 1 from covering over the eyes and stop of the dog. The muzzle body 1 may be made in any of a series of sizes to fit a particular type or size of dog. When the muzzle body 1 is put over the mouth of the dog, the dog is still allowed to open its mouth within a limited range so as to drink water.

Referring to FIG. 4 again, a strap 2 is fastened to the muzzle body 1, and adapted for securing the muzzle body 1 to the head of the dog over its mouth. The strap 2 comprises a fixed middle part 29 fixedly fastened to the muzzle body 1 by stitches, two free end pieces 26;27 respectively extended from and integral with two opposite ends of the fixed middle part 29, a male snap element 21 and a female snap element 22 respectively fastened to the free end pieces 26;27 and adapted to join them. The fixed iddle part 29 of the strap 2 is wound round the muzzle body 1 and fixed thereto by stitches, then crossed over each other at the bottom side of the muzzle body 1 and extended upwardly backwards to two opposite rear corners of the top opening 11 and then fixedly secured to the muzzle body 1 in a substantially V-shaped form by stitches, permitting an about 15° contained angle to be defined between the free end pieces 26;27. When a drag force is applied to the muzzle body 1, the drag force is distributed into horizontal components of force and vertical components of force. Because the contained angle defined between the free end pieces 26;27, the total amount of horizontal components of force is much less than the total amount of vertical components of force. Therefore, when a drag force is applied to the muzzle 10, the muzzle 10 is not pulled backwards relative to the head of the dog, i.e., dragging the muzzle 10 does not cause the muzzle 10 to be pulled backwards and covered over the dog's eyes.

Referring to FIGS. 4 and 5 again, a hanging ring 23 is fastened to one end piece 27, and an adjustment loop 25 is fastened to the other end piece 26. Through the hanging ring 23, a swivel hook 31 of a lead 3 can be fastened to the muzzle 10, so that the dog's master can walk the dog by means of the lead 3. Through the adjustment loop 25, the length of the corresponding end piece 26 can be adjusted.

Figure 6:
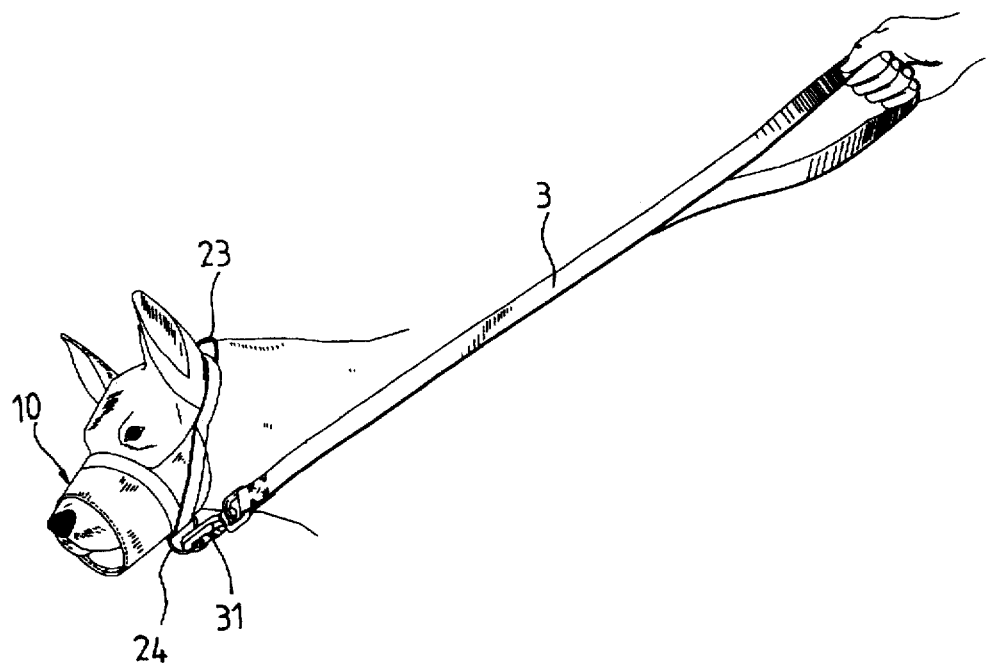
FIG. 6 is another applied view of the present invention, showing the muzzle body fastened to the head of a dog, and a swivel hook of a lead fastened to a hanging ring on the crossed point of the fixed middle part of the strap.

FIG. 6 shows an alternate form of the present invention, in which a D-shaped hanging ring 24 is secured to the crossed point of the fixed middle part 29 of the strap 2 at the bottom side of the muzzle body 1, and a swivel hook 31 of a lead 3 is fastened to the D-shaped hanging ring 24. This design is suitable for a big size dog. When the lead 3 is pulled, the head of the dog is forced downwards, and the dog is stopped from rushing out.

It is to be understood that the drawings are designed for purposes of illustration only, and are not intended as a definition of the limits and scope of the invention disclosed.

What the invention claimed is:

1. A dog muzzle comprising a cylindrical muzzle body adapted to put over the mouth of a dog to keep it from biting, and a strap fastened to said muzzle body and adapted to secure it to the dog's head, said muzzle body having a top opening at a rear part thereof, said strap comprising two free end pieces extended from two opposite ends thereof, and buckle means adapted to joint the free end pieces of said strap, wherein said strap comprises a fixed middle part connected between its two free end pieces, the fixed middle part of said strap is wound round said muzzle body and fixed thereto by stitches, then crossed over each other at a bottom side of said muzzle body and extended upwardly backwards to two opposite rear corners of said top opening and then fixedly secured to said muzzle body in a substantially V-shaped form by stitches.

2. The dog muzzle of claim 1 further comprising a hanging ring fastened to one end piece of said strap for mounting a lead.

3. The dog muzzle of claim 1 further comprising a hanging ring fastened to the crossed point of the middle part of said strap for mounting a lead.

* * * * *